United States Patent
Xu et al.

(10) Patent No.: US 11,834,359 B2
(45) Date of Patent: Dec. 5, 2023

(54) METHOD FOR ENHANCING ANAEROBIC DIGESTION BASED ON SOLID-LIQUID INTERFACE RENEWAL IN SLUDGE

(71) Applicants: Tongji University, Shanghai (CN); Shanghai Urban Pollution Control Engineering Research Center Co., Ltd., Shanghai (CN)

(72) Inventors: Ying Xu, Shanghai (CN); Xiaohu Dai, Shanghai (CN)

(73) Assignees: TONGJI UNIVERSITY, Shanghai (CN); SHANGHAI URBAN POLLUTION CONTROL ENGINEERING RESEARCH CENTER CO., LTD., Shanghai (CN)

( * ) Notice: Subject to any disclaimer, the term of this patent is extended or adjusted under 35 U.S.C. 154(b) by 217 days.

(21) Appl. No.: 17/484,641

(22) Filed: Sep. 24, 2021

(65) Prior Publication Data

US 2022/0098073 A1 Mar. 31, 2022

(30) Foreign Application Priority Data

Sep. 27, 2020 (CN) .......................... 202011036185.3

(51) Int. Cl.
  *C02F 9/00* (2023.01)
  *C02F 11/13* (2019.01)
  *C02F 1/66* (2023.01)
  *C02F 11/04* (2006.01)
  *C02F 11/127* (2019.01)

(52) U.S. Cl.
  CPC .................. *C02F 9/00* (2013.01); *C02F 1/66* (2013.01); *C02F 11/04* (2013.01); *C02F 11/127* (2013.01); *C02F 11/13* (2019.01)

(58) Field of Classification Search
  CPC ......... C02F 1/66; C02F 11/04; C02F 11/127; C02F 11/13; C02F 2209/02; C02F 2209/10; C02F 2209/44; C02F 9/00; Y02E 50/30
  USPC ....................................................... 210/609
  See application file for complete search history.

(56) References Cited

U.S. PATENT DOCUMENTS

2004/0164019 A1* 8/2004 Fassbender ............... C02F 1/02
                                                                  210/603
2020/0062629 A1* 2/2020 Theodoulou ............ C02F 3/282

* cited by examiner

*Primary Examiner* — Claire A Norris
(74) *Attorney, Agent, or Firm* — M&B IP Analysts, LLC

(57) ABSTRACT

A method for enhancing anaerobic digestion based on solid-liquid interface renewal in sludge is disclosed. The method includes subjecting sludge to a centrifugation, a thermal baking and a redissolution in softened water in sequence to renew a solid-liquid interface in sludge, and subjecting the sludge to an anaerobic digestion to increase methane production from organic matter in the sludge by anaerobic biotransformation.

6 Claims, 1 Drawing Sheet

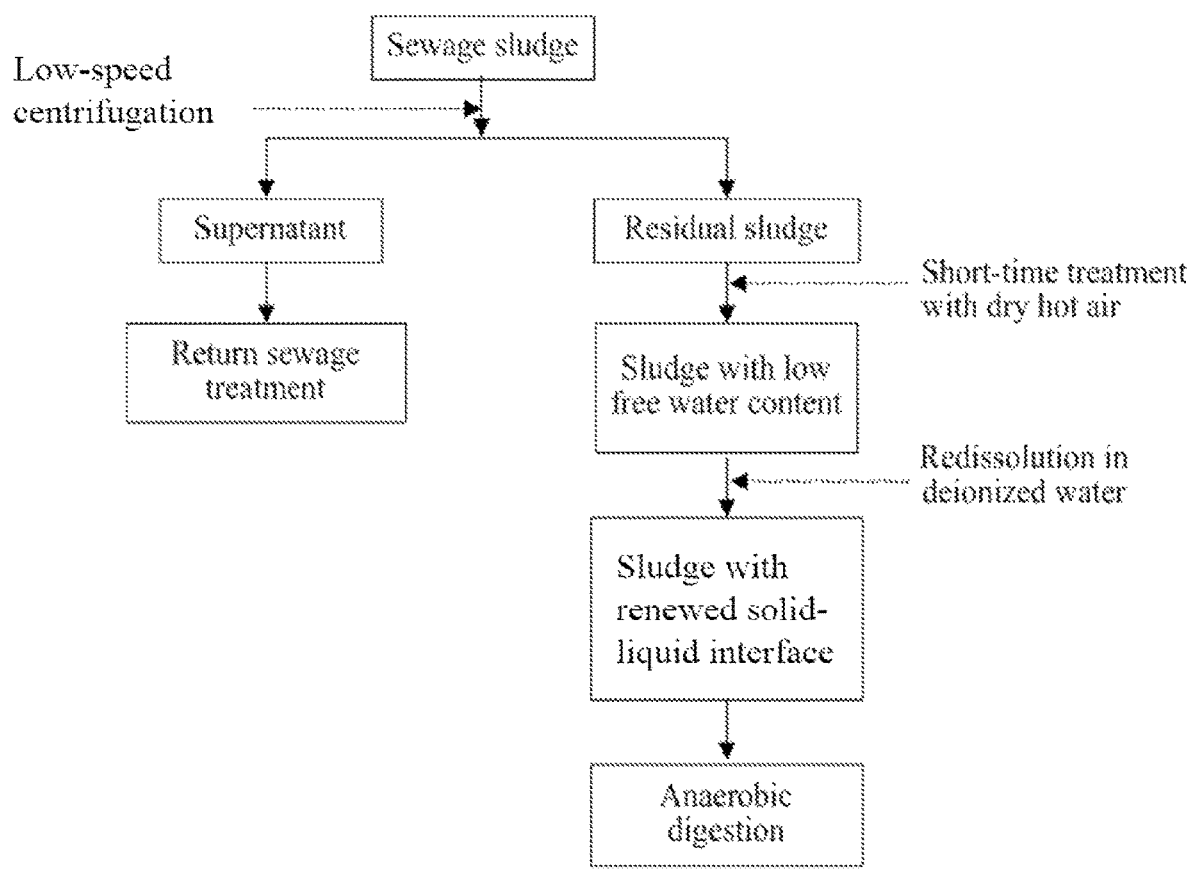

METHOD FOR ENHANCING ANAEROBIC DIGESTION BASED ON SOLID-LIQUID INTERFACE RENEWAL IN SLUDGE

CROSS REFERENCE TO RELATED APPLICATION

This application claims the benefit and priority of Chinese Patent Application No. 202011036185.3 filed on Sep. 27, 2020, the disclosure of which is incorporated by reference herein in its entirety as part of the present application.

TECHNICAL FIELD

The present disclosure belongs to the technical field of sludge recycling, and particularly relates to a method for enhancing anaerobic digestion based on solid-liquid interface renewal in sludge.

BACKGROUND ART

With the extensive use of the activated sludge process in urban sewage treatment plants, a large amount of excess sludge has been produced. According to statistics, the annual output of sewage sludge has already exceeded 65 million tons (calculated according to a moisture content of 80%), and has been increasing at 10% per year. Sludge is rich in perishable organic matter and hazardous and noxious substances, and if not treated properly, would cause severe secondary pollution. By anaerobic digestion, the environmental pollution caused by the sludge is reduced and meanwhile an energy source such as methane-rich biogas (the proportion of methane being about 65%) can be recovered from sludge. Thus, anaerobic digestion has become a highly favored sludge treatment technique all around the world. However, anaerobic sludge digestion has a low efficiency, which has been limiting its promotion and use. For example, conventional anaerobic sludge digestion takes 30 days, and a removal rate of organic matter per unit of sludge is less than 50% (in terms of VS), and a yield of methane from organic matter per unit of sludge by anaerobic biotransformation is not more than 300 mL $CH_4$/g VS, which is far below a theoretical methane yield (450 to 600 mL $CH_4$/g VS) and that from other perishable organic wastes (e.g., kitchen wastes).

Currently, it is commonly believed that the degree of hydrolysis and the anaerobic biodegradability of organic matter in sludge are key factors limiting the efficiency of anaerobic sludge digestion. To make a breakthrough in the two key factors, a lot of sludge pretreatment methods have been proposed, such as alkaline pretreatment, hydrothermal pretreatment, microwave pretreatment, ozone pretreatment, high pressure homogeneous pretreatment, and ultrasonic pretreatment. Such treatment methods could enhance the dissolution of organic matter in sludge to a certain extent, but treatment effects are often varied among sludge and even more hardly degradable organic matter are produced. For example, the hydrothermal pretreatment at a high temperature may usually induce Maillard reaction, thereby producing a large quantity of hardly degradable organic molecules. Besides, the high temperature hydrothermal condition will induce polycondensation of micromolecular organic matter in sludge, and the resulting macromolecules may further increase the difficulty of anaerobic biodegradation. Traditional pretreatment methods generally have the disadvantages of lack of targeted treatment and unspecific basis of pretreatment. Furthermore, although the pretreatment could improve the dissolution of organic matter, it may reduce the biodegradability of the dissolved organic matter.

SUMMARY

An object of the present disclosure is to provide a method for enhancing anaerobic digestion based on solid-liquid interface renewal in sludge to solve the problem of low efficiency of sludge anaerobic digestion.

The object of the present disclosure is achieved by the following technical solutions.

Disclosed is a method for enhancing anaerobic digestion based on solid-liquid interface renewal in sludge, including subjecting sludge to a centrifugation, a thermal baking and a redissolution in softened water in sequence to renew a solid-liquid interface in the sludge, and subjecting the sludge to an anaerobic digestion to increase methane production from organic matter in the sludge by anaerobic biotransformation.

The applicant has found that the methane production potential of organic matter in sludge by anaerobic biotransformation could be realized by changing the physical structure of sludge and the spatial conformation of organic macromolecules. Therefore, in sludge pretreatment, we shall not focus only on the degree of dissolution and the degree of hydrolysis of organic matter directly resulting from the pretreatment. In contrast, the physical structure of sludge and the spatial conformation of organic macromolecules may be changed by a mild pretreatment approach to achieve spontaneous enhancement of the dissolution and hydrolysis of organic matter in sludge during the anaerobic digestion. Since the solid-liquid interface in sludge is a determinant influencing the physical structure of sludge and the spatial conformation of organic macromolecules, which are directly related to the methane production potential of organic matter in sludge by anaerobic biotransformation, the present disclosure provides a method for enhancing anaerobic digestion based on solid-liquid interface renewal in sludge.

According to the present disclosure, through a centrifugation, a thermal baking and a redissolution in softened water, the solid-liquid interface in sludge could be renewed, and the physical structure of the sludge and the spatial conformation of organic macromolecules could be changed, so that the surface energy of sludge particles is increased and the energy barrier for the transformation of organic matter in the sludge from solid to liquid is reduced, thereby enhancing the biodegradability of organic matter in the sludge.

Centrifugation and thermal baking treatment significantly change the moisture distribution in sludge, decrease the free water content, reduce extracellular electron transport resistance during biochemical reaction, and improve the electron utilization efficiency during anaerobic digestion. Moreover, the redissolution of sludge in softened water disturbs the original ionic equilibrium in the sludge, and thereby reduces ionic strength in the vicinity of the solid-liquid interface in the sludge, impairs electrostatic repulsion between sludge particles, strengthens Lewis acid-base interaction on the surface of sludge particles, and increases sites and driving force for effective binding of the surface of the sludge particles and enzyme molecules.

In some embodiments, the centrifugation is a low-speed centrifugation. The centrifugation includes centrifuging sludge at a relative centrifugal force (RCF) of 2,000 to 8,000 g for 5 to 20 minutes, and subjecting the sludge to a solid-liquid separation, and collecting residual sludge. The relative centrifugal force is further preferably 2,000 g/20 minutes, 3,000 g/15 minutes, 4,000 g/10 minutes, 5,000 g/5 minutes, 6,000 g/10 minutes, 7,000 g/5 minutes, 8,000 g/10 minutes, 8,000 g/15 minutes, 6,000 g/20 minutes, 4,000 g/20 minutes or 4,000 g/15 minutes.

In some embodiments, the thermal baking is a treatment with dry hot air at a constant temperature, and the dry hot air is provided by an electricthermal blower or a combustion heating blower. In some embodiments, the thermal baking is performed at a temperature of 80 to 105° C. for 30 to 120 minutes. In some embodiments, the time and temperature for the treatment with dry hot air at a constant temperature are 80° C. and 120 minutes respectively, 85° C. and 110 minutes respectively, 90° C. and 100 minutes respectively, 95° C. and 90 minutes respectively, 100° C. and 80 minutes respectively, 105° C. and 70 minutes respectively, 105° C. and 30 minutes respectively, 105° C. and 60 minutes respectively, 105° C. and 90 minutes respectively, or 105° C. and 120 minutes respectively.

In some embodiments, the redissolution in softened water includes redissolving sludge in softened water and fully mixing, and the softened water is any one selected from the group consisting of deionized water, distilled water, ultrapure water, and water after removal of calcium, magnesium, aluminum and iron ions.

In some embodiments, the redissolution in softened water is performed by a stirring at 200-400 r/min for 0.5 to 2 hours, preferably at 200 r/min for 2 hours, 300 r/min for 1 hour, 400 r/min for 0.5 hour, 200 r/min for 1 hour, 300 r/min for 2 hours, 400 r/min for 2 hours, 400 r/min for 1 hour, 300 r/min for 0.5 hour, 200 r/min for 0.5 hour, 400 r/min for 1.5 hours, 300 r/min for 1.5 hours, or 200 r/min for 1.5 hours.

In some embodiments, the anaerobic digestion includes transferring overall sludge into an anaerobic reactor, regulating a pH of the sludge to 6.0 to 8.0 with an acid liquor or alkali liquor, and subjecting the sludge to an anaerobic digestion at a medium temperature of 30-40° C. or a high temperature of 50-60° C. for 5-15 days with an inoculation ratio of 1:2 to 2:1 (in terms of VS).

In some embodiments, the acid liquor is a 6.0 mol/L hydrochloric acid solution, and the alkali liquor is a 6.0 mol/L sodium hydroxide solution, and the sludge is sewage sludge with a total solids (TS) content of 0.5-2.5%.

In some embodiments, the method for enhancing anaerobic digestion based on solid-liquid interface renewal in sludge includes the following specific steps:

(1) subjecting sewage sludge to a low speed centrifugation and a solid-liquid separation, and collecting residual sludge;

(2) subjecting the residual sludge in step (1) to a treatment with dry hot air at a constant temperature for a period of time;

(3) redissolving the sludge after the treatment with dry hot air at a constant temperature in step (2) in softened water, and fully mixing; and (4) transferring overall sludge in step (3) into an anaerobic reactor, regulating a pH of the sludge to 6.0 to 8.0 with an acid liquor or alkali liquor, and subjecting the sludge to an anaerobic digestion at a medium temperature of 30 to 40° C. or a high temperature of 50 to 60° C. for 5 to 15 days with an inoculation ratio of 1:2 to 2:1 (in terms of VS).

In step (1), a low-speed centrifugation is conducted, and then a solid-liquid separation is conducted, which is mainly intended to remove part of free water and a plurality of dissociative ions in the original sludge system, and disturb the original ionic equilibrium of the solid-liquid interface in the sludge. Thereby, the surface of sludge particles is exposed.

In step (2), subjecting the residual sludge to a treatment with dry hot air at a constant temperature is mainly intended to change the distribution of water molecules in sludge by removing free water from the surface of sludge, and meanwhile change the internal physical structure and surface microstructure of sludge by means of the escape of water molecules.

In step (3), the redissolution of sludge in softened water is mainly intended to reconstruct the hydrogen bond distribution on the surface of sludge particles with water having low ionic strength, and promote transfer of micromolecular organic matter in solid sludge to liquid by means of the difference in ionic strength, and meanwhile fill the internal porous structure of the sludge with free water molecules, thereby changing the physical structure of the sludge and the spatial conformation of organic macromolecules and causing more organic molecules in the sludge to expose binding sites for enzymatic reaction.

In step (4), the defined temperature, inoculation ratio, time for reaction and pH are mainly for the purposes of providing a favorable living environment for anaerobic bacteria, enhancing the synergistic effect of hydrolytic acidifying bacteria and methanogenic bacteria and improving the efficiency of anaerobic methane production from organic matter in sludge.

Compared with the prior art, technical solutions of the present disclosure has the following advantages:

The present disclosure provides a new sludge pretreatment idea, i.e., renewing the solid-liquid interface in sludge under a mild pretreatment condition, thereby reducing the energy barrier for the transformation of organic matter from solid to liquid, reducing the ionic strength in the vicinity of the solid-liquid interface in the sludge, impairing electrostatic repulsion between sludge particles, strengthening Lewis acid-base interaction on the surface of sludge particles, increasing sites and driving force for effective binding of organic matter in solid sludge and enzyme molecules, and improving the enzymatic reaction efficiency of the sludge during anaerobic digestion. The low-speed centrifugation and treatment with dry hot air in the present disclosure significantly change the moisture distribution in sludge, decrease the free water content, reduce extracellular electron transport resistance during biochemical reaction, and improve the electron utilization efficiency during the anaerobic digestion, thereby greatly promoting a significant increase (increased by 50% to 200%) in methane production from organic matter in sludge by anaerobic biotransformation and greatly enhancing anaerobic digestion efficiency of sludge.

BRIEF DESCRIPTION OF THE DRAWINGS

FIGURE shows a flowchart of a method according to an embodiment of the present disclosure.

DETAILED DESCRIPTION OF THE EMBODIMENTS

The present disclosure will be described in detail in conjunction with the accompanying drawings and specific examples. The following is detailed description of the present disclosure in conjunction with examples, and the examples are not intended to limit the present disclosure. Any similar methods to the present disclosure and similar alterations thereof shall be encompassed in the scope of the present disclosure.

FIGURE shows a flowchart of a method according to one embodiment of the present disclosure. According to the present disclosure, sludge was subjected to a centrifugation, a thermal baking and a redissolution in softened water, so that the solid-liquid interface in sludge was renewed to reduce the energy barrier for the dissolution of organic matter, increase sites and driving force for effective binding of organic matter in sludge and enzyme molecules, reduce extracellular electron transport resistance during biochemical reaction and improve the electron utilization efficiency during anaerobic digestion, thereby increasing a yield of methane from organic matter per unit of sludge and enhancing the anaerobic digestion efficiency of sludge. All devices and chemicals were those commonly used.

Sludge used in examples was excess sludge (VS=51.2% to 65.7%, TS=0.8% to 2.3%) from a sewage treatment plant in Suzhou, and seeding sludge (VS=37.5% to 48.7%, TS=2.6% to 5.1%) used in anaerobic digestion was sludge discharged from a semi-batch anaerobic reactor.

Example 1

1. 1,000 mL of sewage sludge was centrifuged at a relative centrifugal force (RCF) of 2,000 g for 20 minutes and subjected to a solid-liquid separation, and residual sludge was collected.
2. The residual sludge in step 1 was put into a drying oven at 80° C. and subjected to a treatment with dry hot air at the constant temperature for 120 minutes.
3. The sludge after the treatment with dry hot air at 80° C. in step 2 was redissolved in 500 mL of softened water by a stirring at 200 r/min for 2 hours.
4. Overall sludge in step 3 was transferred into an anaerobic reactor and its pH was regulated to a range of 6.0 to 8.0 with an acid liquor or alkali liquor, and the sludge was subjected to an anaerobic digestion at 37° C. for 15 days with an inoculation ratio of 1:2 (in terms of VS). Biochemical methane potential (BMP) tester of an automatic methane potential test system (AMPTS II) was used to record data automatically, and a methane yield (mL $CH_4$/g VS) per unit of organic matter was calculated. The result showed that the methane yield (mL $CH_4$/g VS) per unit of organic matter was increased by 80% after the sludge was treated by this method.

Example 2

1. 1,000 mL of sewage sludge was centrifuged at an RCF of 4,000 g for 10 minutes and subjected to a solid-liquid separation, and residual sludge was collected.
2. The residual sludge in step 1 was put into a drying oven at 105° C. and subjected to a treatment with dry hot air at the constant temperature for 90 minutes.
3. The sludge after the treatment with dry hot air at 105° C. in step 2 was redissolved in 500 mL of softened water by a stirring at 300 r/min for 2 hours.
4. Overall sludge in step 3 was transferred into an anaerobic reactor and its pH was regulated to a range of 6.0 to 8.0 with an acid liquor or alkali liquor, and the sludge was subjected to an anaerobic digestion at 37° C. for 15 days with an inoculation ratio of 1:1 (in terms of VS). BMP tester of an AMPTS II was used to record data automatically, and a methane yield (mL $CH_4$/g VS) per unit of organic matter was calculated.

The result showed that the methane yield (mL $CH_4$/g VS) per unit of organic matter was increased by 200% after the sludge was treated by this method.

Example 3

1. 1,000 mL of sewage sludge was centrifugated at an RCF of 6,000 g for 10 minutes and subjected to a solid-liquid separation, and residual sludge was collected.
2. The residual sludge in step 1 was put into a drying oven at 95° C. and subjected to a treatment with dry hot air at the constant temperature for 90 minutes.
3. The sludge after the treatment with dry hot air at the constant temperature in step 2 was redissolved in 500 mL of softened water by a stirring at 400 r/min for 0.5 hour.
4. Overall sludge in step 3 was transferred into an anaerobic reactor and its pH was regulated to a range of 6.0 to 8.0 with an acid liquor or alkali liquor, and the sludge was subjected to an anaerobic digestion at 37° C. for 15 days with an inoculation ratio of 1:2 (in terms of VS). BMP tester of an AMPTS II was used to record data automatically, and a methane yield (mL $CH_4$/g VS) per unit of organic matter was calculated.

The result showed that the methane yield (mL $CH_4$/g VS) per unit of organic matter was increased by 100% after the sludge was treated by this method.

Example 4

1. 1,000 mL of sewage sludge was centrifuged at an RCF of 4,000 g for 15 minutes and subjected to a solid-liquid separation, and residual sludge was collected.
2. The residual sludge in step 1 was put into a drying oven at 100° C. to and subjected to a treatment with dry hot air at the constant temperature for 80 minutes.
3. The sludge after the treatment with dry hot air at the constant temperature in step 2 was redissolved in 500 mL of softened water by a stirring at 300 r/min for 1 hour.
4. Overall sludge in step 3 was transferred into an anaerobic reactor and its pH was regulated to a range of 6.0 to 8.0 with an acid liquor or alkali liquor, and the sludge was subjected to an anaerobic digestion at 37° C. for 15 days with an inoculation ratio of 1:2 (in terms of VS). BMP tester of an AMPTS II was used to record data automatically, and a methane yield (mL $CH_4$/g VS) per unit of organic matter was calculated.

The result showed that the methane yield (mL $CH_4$/g VS) per unit of organic matter was increased by 150% after the sludge was treated by this method.

Example 5

1. 1,000 mL of sewage sludge was centrifugated at an RCF of 8,000 g for 15 minutes and subjected to a solid-liquid separation, and residual sludge was collected.
2. The residual sludge in step 1 was put into a drying oven at 105° C. and subjected to a treatment with dry hot air at the constant temperature for 60 minutes.
3. The sludge after the treatment with dry hot air at the constant temperature in step 2 was redissolved in 500 mL of softened water by a stirring at 300 r/min for 2 hours.

4. Overall sludge in step 3 was transferred into an anaerobic reactor and its pH was regulated to a range of 6.0 to 8.0 with an acid liquor or alkali liquor, and the sludge was subjected to an anaerobic digestion at 55° C. for 10 days with an inoculation ratio of 2:1 (in terms of VS). BMP tester of an AMPTS II was used to record data automatically, and a methane yield (mL $CH_4$/g VS) per unit of organic matter was calculated.

The result showed that the methane yield (mL $CH_4$/g VS) per unit of organic matter was increased by 160% after the sludge was treated by this method.

Example 6

1. 1,000 mL of sewage sludge was centrifuged at an RCF of 3,000 g for 15 minutes and subjected to a solid-liquid separation, and residual sludge was collected.
2. The residual sludge in step 1 was put into a drying oven at 80° C. and subjected to a treatment with dry hot air at the constant temperature for 30 minutes.
3. The sludge after the treatment with dry hot air at the constant temperature in step 2 was redissolved in 500 mL of softened water by a stirring at 200 r/min for 0.5 hour.
4. Overall sludge in step 3 was transferred into an anaerobic reactor and its pH was regulated to a range of 6.0 to 8.0 with an acid liquor or alkali liquor, and the sludge was subjected to an anaerobic digestion at 55° C. for 5 days with an inoculation ratio of 2:1 (in terms of VS). BMP tester of an AMPTS II was used to record data automatically, and a methane yield (mL $CH_4$/g VS) per unit of organic matter was calculated.

The result showed that the methane yield (mL $CH_4$/g VS) per unit of organic matter was increased by 50% after the sludge was treated by this method.

The following comparative examples were carried out with reference to Example 6.

Comparative Example 1

This comparative example was the same as Example 6, except that the sewage sludge was not centrifuged and not subjected to a solid-liquid separation here.

1. 1,000 mL of sewage sludge was put into a drying oven at 80° C. and subjected to a treatment with dry hot air at the constant temperature for 30 minutes.
2. The sludge after the treatment with dry hot air at the constant temperature in step 1 was redissolved in 500 mL of softened water by a stirring at 200 r/min for 0.5 hour.
3. Overall sludge in step 2 was transferred into an anaerobic reactor and its pH was regulated to a range of 6.0 to 8.0 with an acid liquor or alkali liquor, and the sludge was subjected to an anaerobic digestion at 55° C. for 5 days with an inoculation ratio of 2:1 (in terms of VS). BMP tester of an AMPTS II was used to record data automatically, and a methane yield (mL $CH_4$/g VS) per unit of organic matter was calculated.

The result showed that the methane yield (mL $CH_4$/g VS) per unit of organic matter was increased by 10% after the sludge was treated by this method.

Comparative Example 2

This comparative example was the same as Example 6 except that the sewage sludge was not subjected to a treatment with dry hot air at a constant temperature here.

1. 1,000 mL of sewage sludge was centrifuged at an RCF of 3,000 g for 15 minutes and subjected to a solid-liquid separation, and residual sludge was collected.
2. The sludge obtained in step 1 was redissolved in 500 mL of softened water by a stirring at 200 r/min for 0.5 hour.
3. Overall sludge in step 2 was transferred into an anaerobic reactor and its pH was regulated to a range of 6.0 to 8.0 with an acid liquor or alkali liquor, and the sludge was subjected to an anaerobic digestion at 55° C. for 5 days with an inoculation ratio of 2:1 (in terms of VS). BMP tester of an AMPTS II was used to record data automatically, and a methane yield (mL $CH_4$/g VS) per unit of organic matter was calculated.

The result showed that the methane yield (mL $CH_4$/g VS) per unit of organic matter was only increased by 5% after the sludge was treated by this method.

Comparative Example 3

This comparative example was the same as Example 6, except that the sludge was not redissolved in softened water here.

1. 1,000 mL of sewage sludge was centrifuged at an RCF of 3,000 g for 15 minutes, and subjected to a solid-liquid separation, and residual sludge was collected.
2. The residual sludge in step 1 was put into a drying oven at 80° C., and subjected to a treatment with dry hot air at the constant temperature for 30 minutes.
3. Overall sludge in step 2 was transferred into an anaerobic reactor and its pH was regulated to a range of 6.0 to 8.0 with an acid liquor or alkali liquor, and the sludge was subjected to an anaerobic digestion at 55° C. for 5 days with an inoculation ratio of 2:1 (in terms of VS). BMP tester of an AMPTS II was used to record data automatically, and a methane yield (mL $CH_4$/g VS) per unit of organic matter was calculated.

The result showed that the methane yield (mL $CH_4$/g VS) per unit of organic matter was only increased by 15% after the sludge was treated by this method.

Comparative Example 4

This comparative example was the same as Example 6, except that the sequence of centrifugation and the treatment with dry hot air at the constant temperature was changed here.

1. 1,000 mL of sewage sludge was put into a drying oven at 80° C., and subjected to a treatment with dry hot air at the constant temperature for 30 minutes.
2. The sludge from step 1 was centrifuged at an RCF of 3,000 g for 15 minutes and subjected to a solid-liquid separation, and residual sludge was collected.
3. The residual sludge in step 2 was redissolved in 500 mL of softened water by a stirring at 200 r/min for 0.5 hour.
4. Overall sludge in step 3 was transferred into an anaerobic reactor and its pH was regulated to a range of 6.0 to 8.0 with an acid liquor or alkali liquor, and the sludge was subjected to an anaerobic digestion at 55° C. for 5 days with an inoculation ratio of 2:1 (in terms of VS). BMP tester of an AMPTS II was used to record data automatically, and a methane yield (mL $CH_4$/g VS) per unit of organic matter was calculated.

The results showed that the methane yield (mL $CH_4$/g VS) per unit of organic matter was only increased by 20% after the sludge was treated by this method. From Comparative Examples 1 to 4, during the treatment of sludge, if the sludge was not subjected to a centrifugation, a thermal baking and a redissolution in softened water in sequence, it was impossible to achieve a good effect and the methane yield from organic matter was at a low level. If the sequence of the treatment steps was changed (e.g., in Comparative Example 4), the effect was still unsatisfactory. The solid-liquid interface in sludge could be renewed better and the methane production from organic matter in the sludge by anaerobic biotransformation could be increased only when the sludge was subjected to a centrifugation, a thermal baking and a redissolution in softened water in sequence.

The above description of the embodiments is intended to help a person of ordinary skill in the art to understand and use the disclosure. Obviously, a person skilled in the art could easily make various modifications to these embodiments, and apply a general principle described herein to other embodiments without creative efforts. Therefore, the disclosure is not limited to the above embodiments. All improvements and modifications made by a person skilled in the art according to implication of the disclosure without departing from the spirit of the disclosure should fall within the scope of the disclosure.

What is claimed is:

1. A method for enhancing anaerobic digestion based on solid-liquid interface renewal in sludge, comprising
subjecting sludge to a centrifugation, a thermal baking, and a redissolution in softened water in sequence to renew a solid-liquid interface in the sludge, and subjecting the sludge to an anaerobic digestion.

2. The method for enhancing anaerobic digestion based on solid-liquid interface renewal in sludge as claimed in claim 1, wherein the centrifugation comprises centrifuging sludge at a relative centrifugal force of 2,000 to 8,000 g for 5 to 20 minutes, subjecting the sludge to a solid-liquid separation, and collecting residual sludge.

3. The method for enhancing anaerobic digestion based on solid-liquid interface renewal in sludge as claimed in claim 1, wherein the thermal baking is a treatment with dry hot air at a constant temperature.

4. The method for enhancing anaerobic digestion based on solid-liquid interface renewal in sludge as claimed in claim 3, wherein the dry hot air is provided by an electricthermal blower or a combustion heating blower; and the thermal baking is performed at a temperature of 80° C. to 105° C. for 30 minutes to 120 minutes.

5. The method for enhancing anaerobic digestion based on solid-liquid interface renewal in sludge as claimed in claim 1, wherein the redissolution in softened water comprises redissolving the sludge in softened water and mixing, and the softened water is any one selected from the group consisting of deionized water, distilled water, ultrapure water, and water after removal of calcium, magnesium, aluminum and iron ions.

6. The method for enhancing anaerobic digestion based on solid-liquid interface renewal in sludge as claimed in claim 1, wherein the redissolution in softened water is performed by a stirring at a rotation rate of 200 r/min to 400 r/min for 0.5 to 2 hours.

* * * * *